Oct. 25, 1960  V. B. KWAST  2,958,038
ELECTRICAL TACHOMETER
Filed Oct. 22, 1957
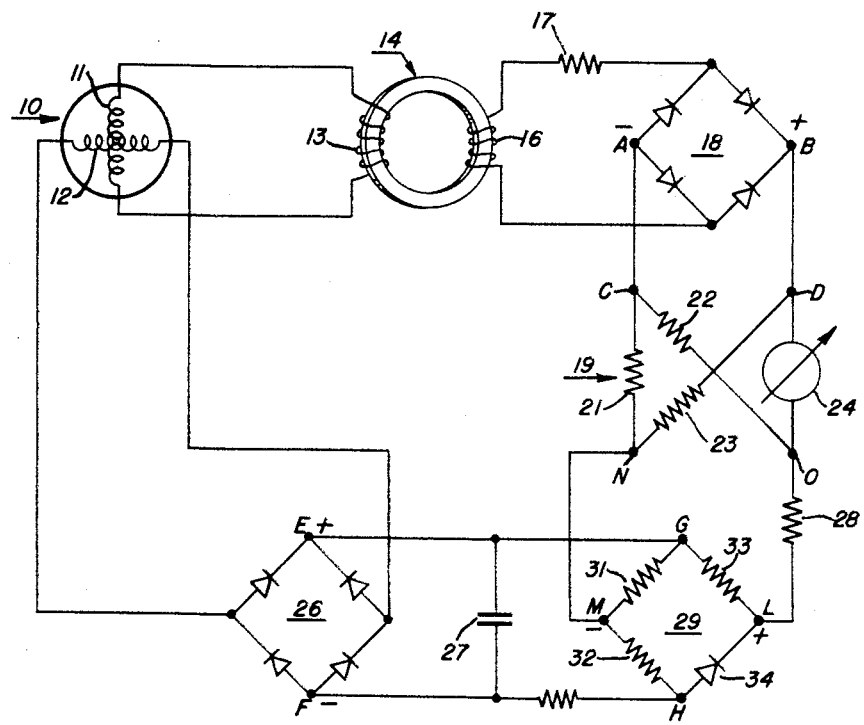
VICTOR B. KWAST
INVENTOR.
BY
Rudolph J. Junick
ATTORNEY

United States Patent Office 2,958,038
Patented Oct. 25, 1960

2,958,038

ELECTRICAL TACHOMETER

Victor B. Kwast, Union, N.J., assignor, by mesne assignments, to Daystrom, Incorporated, Murray Hill, N.J., a corporation of New Jersey Filed Oct. 22, 1957, Ser. No. 691,772

7 Claims. (Cl. 324—70)

This invention relates to an electrical tachometer arrangement for indicating speed and more particularly to an arrangement wherein the speed-indicating range of the associated indicating instrument may be suppressed and/or expanded.

The tachometer of my invention is of the frequency sensitive type wherein the voltage output from an alternating current generator, which is rotated at a speed proportional to the speed of rotation of the device under measurement, is applied through a saturable core transformer, operating beyond the saturated region, to a rectifier and, thence, to a D.-C. meter calibrated in speed values. The suppression of the meter indication in the above-described frequency-sensitive type tachometer arrangements has been achieved by various well known circuitry. The circuit is so ararnged that the pointer of the indicating instrument does not move upscale until the voltage output of the tachometer generator exceeds a reference voltage. Consequently when the tachometer generator is rotating at a speed below that at which the generated voltage exceeds the reference voltage, the pointer of the meter will be below the lowest mark on the scale. Since the low scale mark corresponds with the zero (no current) position of the pointer, arrangements of this type are generally referred to as suppressed zero tachometers. In one form of prior art suppressed zero tachometer, the reference voltage, which is connected in opposition to the tachometer generator voltage, is derived from an ordinary 60 cycle per second power line feeding a saturable core transformer. The transformer output remains constant with a constant frequency source. The application of such suppressed zero tachometers is limited to locations at which the stable 60 cycle per second source is available. Obviously, such an alternating current source is not always available.

In another form of contemporary suppressed zero tachometer, the suppression, or reference voltage, is derived from a battery source, or the like. The disadvantage of such arrangement lies in the fact that a separate battery is required and such batteries do not maintain a constant voltage over extended periods of time due to ageing, and the like.

The above-mentioned disadvantages and short-comings of prior suppressed zero tachometers are eliminated in my novel tachometer wherein only stable, passive, circuit elements are used. The reference voltage level is self-produced whereby the need for a separate external, stable source is eliminated.

An object of this invention is the provision of a suppressed zero tachometer wherein the reference, or suppression, potential is self-produced.

An object of this invention is the provision of a suppressed zero tachometer in which the mechanical torque on the indicating instrument is zero when the tachometer generator is not being rotated.

An object of this invention is the provision of a suppressed zero tachometer comprising, a generator producing two output voltages, means converting one of the generator output voltages to a D.-C. potential proportional to the frequency thereof, means converting the other generator output voltage to a constant D.-C. reference voltage, and means connecting the constant D.-C. reference voltage in opposition to the said proportionate D.-C. potential, the resultant D.-C. potential being proportional to the speed of generator rotation above a predetermined speed.

These and other objects and advantages will become apparent from the following description when taken with the accompanying drawing. The drawing is for purposes of illustration and is not to be construed as defining the scope or limits of the invention, reference being had for the latter purposes to the appended claims.

The single drawing is a schematic circuit diagram of a suppressed zero tachometer embodying my invention.

Referring to the drawing, reference numeral 10 designates a generator having two windings 11 and 12 for the production of two voltage outputs. The phase relation between the two generator output voltages is unimportant and does not enter into the operation of my device. In practice, however, for moderate rotational speeds, between 500 and 15,000 r.p.m., for example, the generator may be of the permanent magnet type comprising a stator having eight (8) coils (connected in two sets of four coils each) and a permanent magnet rotor which is charged to four (4) poles.

The generator output voltage from the winding 11 is connected to the input winding 13 of a saturable core transformer 14. Preferably, the transformer is of the closed ring, ribbon-wound, core type with toroidal primary and secondary windings. The ribbon-wound transformer core is of a material having a generally rectangular B—H loop and a coercivity that is very small. For example, a core which saturates with approximately 0.3 oersted may be used which, when saturated, has a flux density of approximately 14,000 gauss.

The transformer output winding 16 is connected through a resistor 17 to the input diagonals of a full-wave rectifier bridge network 18. The rectifier bridge output diagonals, designated by the reference characters A, B, are connected to input terminals C, D of a differential bridge network 19. The differential bridge is composed of four arms of equal resistance, namely, the three resistors 21, 22 and 23 and a movable coil D.-C. instrument 24.

The generator output voltage from the winding 12 is connected to the input diagonals of a second full-wave rectifier bridge network 26. A capacitor 27 is connected across the output diagonals E, F of the bridge 26 and such diagonals are connected to the input terminals G, H of a reference-current bridge 29. The capacitor 27 serves to maintain the level of the output voltage of the bridge 26 above the Zener voltage of the diode 34 forming one arm of the bridge 29. The other arms of the reference-current, or stabilizing, bridge 29 consist of the resistors 31, 32 and 33. The diode 34 is of the type which exhibits a Zener voltage characteristic when subjected to a reverse potential. The diode has a high inverse voltage characteristic up to the Zener voltage, but above the Zener voltage the impedance is small and substantially constant. Such diodes are commonly made of silicon. The polarity of the D.-C. voltage from the rectifier 26 is such that the diode 34 is connected in a reverse-potential manner, with the cathode thereof connected to the positive end of the rectifier 26 output. The reference-current bridge 29 output terminals L, M are connected to the other input terminals N, O of the differential bridge 19. With an input voltage to the terminals G, H of the reference-current bridge 29 below a predetermined level, the bridge output potential at the terminals L, M is directly related to the input voltage. Within this range of voltages, the Zener diode 34 is nonconducting. Above the predetermined voltage level, the diode conducts, and with resistors 31, 32 and 33 of proper values, the output voltage at the terminals L, M of the reference-current bridge is stable over a very wide range of input variations. The bridge arrangement, which includes the Zener diode 34, is superior to a simple shunt Zener diode arrangement since the bridge circuit utilizes the stabilizing properties of the Zener diode while providing, also, for compensation of the incremental potential drop across the diode with changes of the rectifier 26 output potential.

In normal operation, the core of the transformer 14 saturates during each one-half cycle of input current thereto from the generator winding 11. Therefore, as is well understood by those skilled in this art, the average value of the current pulses in the secondary side of the transformer is proportional to the frequency of the voltage on the primary side. The pulses at the secondary winding are fed through the resistor 17, rectified by the full-wave rectifier 18, and fed to the differential bridge 19. The pulses will vary in frequency according to the rate of rotation of the generator 10, and the current delivered to the input terminals C, D of the bridge 19 from the rectifier 18, will, therefore, be directly proportional to the speed of rotation of the generator.

Below a predetermined generator speed, the generator output from the generator winding 12, which is fed through the rectifier 26 to the reference-current bridge input terminals G, H, results in an output at the terminals L, M which is directly related to the generator speed. Thus, with low generator speeds, the two inputs to the differential bridge terminals C, D and N, O change together, in the same direction. However, I adjust the circuit constants so that the current from the reference-current bridge 19 initially is higher than that of the rectifier bridge 18 whereby the pointer of the meter 24 deflects below the lowermost graduation on the scale. For example, if the scale is calibrated 12,000–15,000 r.p.m., the normal zero position of the pointer coincides with the 12,000 mark. When the generator 10 is rotating at any speed below 12,000 r.p.m. the pointer will move downscale from its normal zero position, thereby providing a positive indication that the circuit and meter are functioning. Unlike contemporary suppressed zero tachometers, no special circuitry is required to protect the instrument 24 within the suppression range.

When the generator output voltage reaches a predetermined level, at a predetermined speed of rotation, and the voltage across the diode 34 reaches the Zener voltage, the diode breaks down and acts as a low resistance circuit component. As explained above, when the diode breaks down, the reference-current bridge output, at the terminals L, M thereof, remains constant so long as generator is rotated at, or above, the predetermined speed. The output from the rectifier 18, on the other hand, varies directly with the generator frequency. The deflection of the instrument 24, therefore, in the differential bridge 19 is directly related to generator speed. The instrument may, if desired, be provided with a scale graduated in terms of r.p.m., or any other suitable terms.

The amount of zero suppression or, more correctly, the actual deflection range of the indicating meter may be controlled by selecting a proper meter sensitivity, and by adjustment of the resistor 17 (which controls the magnitude of the current in the generator measuring circuit) and by adjustment of the resistor 28 (which controls the magnitude of the reference current supplied to the differential bridge 19). Either scale compression or expansion may be achieved. For example, assume that the indicating meter has a normal deflection range of 90 degrees calibrated 0–1000 r.p.m. By utilizing my novel circuit, the first 200 r.p.m. of the tachometer generator may be suppressed so that the effective meter range will be 200–1200 r.p.m. This maintains a constant meter sensitivity of 1000 r.p.m. over the 90 degree deflection and requires only a proper adjustment of the resistor 28 and/or resistor 17. However, the meter indication may be expanded so that the scale range is 200–1000 r.p.m. In this case, the first 200 r.p.m. of the tachometer generator remains suppressed but the meter must deflect 90 degrees for 800 r.p.m. This is accomplished either by changing the meter sensitivity and/or by raising the level of the reference current by adjustment of the resistor 28.

Having now described my invention in detail in accordance with the patent statutes, various changes and modifications will suggest themselves to those skilled in this art, and it is intended that such changes and modifications shall fall within the spirit and scope of the invention as recited in the following claims.

I claim:

1. A tachometer arrangement comprising an A.-C. tachometer generator producing two voltage outputs, first means converting one output voltage to a D.-C. potential proportional substantially solely to the frequency of said one output voltage, second means converting the other voltage output to a predetermined and constant D.-C. potential at generator rotation above a predetermined speed, and means connecting the said D.-C. potentials in opposition, the resultant D.-C. potential providing a measure of the rate of rotation of the said generator above the said predetermined speed.

2. The invention as recited in claim 1 wherein the said first means comprises a series connected saturable core transformer and a rectifier, and the said second means comprises a series connected rectifier and reference-current bridge network.

3. The invention as recited in claim 2 wherein the said reference-current bridge network comprises three resistance elements and a Zener diode in the bridge arms.

4. A zero suppression circuit for a tachometer of the type including an alternating current generator having a pair of output windings, a saturable core transformer having a primary and secondary winding, means connecting one of the generator output windings to the said saturable core transformer primary winding, means rectifying the output from the transformer secondary winding; the said zero suppression circuit comprising a series connected potential limiting circuit and rectifier connected to the other generator output winding, means connecting the output from the said series connected rectifier and potential limiting circuit in opposition to the rectified transformer output, the resultant D.-C. potential providing a suppressed zero indication of the generator speed.

5. The invention as recited in claim 4 wherein the said potential limiting circuit includes a Zener diode.

6. A zero suppression circuit for a frequency sensitive tachometer of the type including an alternating current generator having a pair of output windings, means converting the A.-C. output of one of the said generator output windings to a D.-C. potential directly related to the output frequency; the said zero suppression circuit comprising a rectifier, means connecting the A.-C. output of the other of the said generator output windings to the said rectifier, a Zener diode, means connecting the rectified output from the said rectifier to the said Zener diode in such a manner that the cathode terminal of the said diode is positive with respect to the anode terminal thereof, and means connecting the potential developed across the Zener diode in opposition to the said D.-C. potential which is directly related to the generator output frequency, the resultant D.-C. potential providing a suppressed zero indication of generator speed.

7. A tachometer arrangement comprising an A.-C. tachometer generator producing two voltage outputs, a saturable core transformer having a primary and secondary winding, means connecting one generator output to the said saturable core transformer primary winding, means rectifying the output from the transformer secondary winding, a differential bridge network having two pairs of input diagonals, means connecting the rectified output from the said transformer to one pair of input diagonals of the said differential bridge network, a rectifier, a reference-current bridge having a pair of input and output diagonals, means connecting the other output from the generator to the input diagonals of the said reference-current bridge through the said rectifier, and means connecting the output diagonals of the said reference-current bridge to the other input diagonals of the said differential bridge network.

References Cited in the file of this patent

UNITED STATES PATENTS 2,228,090   Smith _____ Jan. 7, 1941

FOREIGN PATENTS 416,876   Italy _____ Dec. 18, 1946